Feb. 24, 1931.  S. C. HOMMEL  1,793,934
FOOD MIXER AND WHIPPER
Filed Feb. 7, 1930
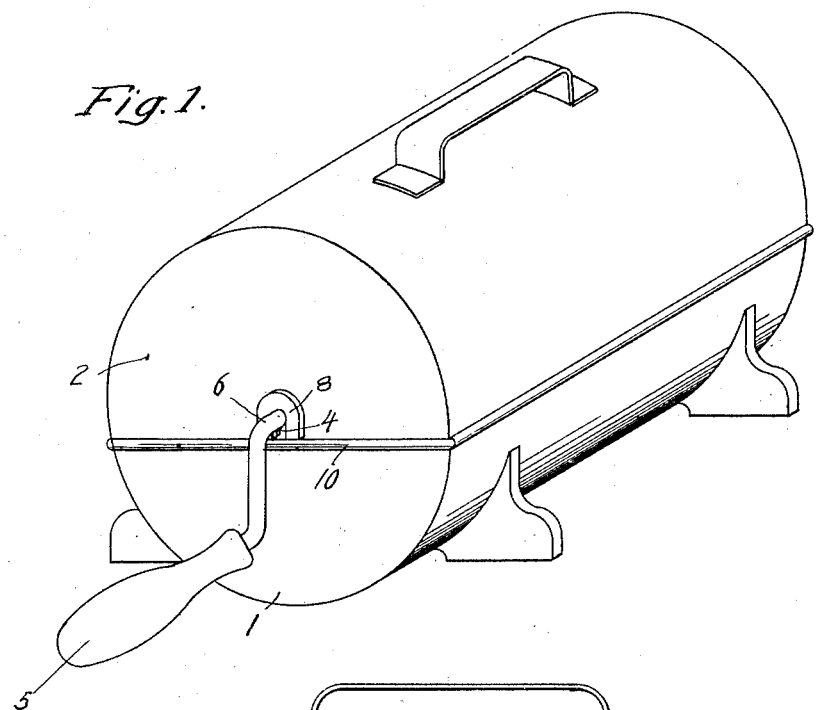
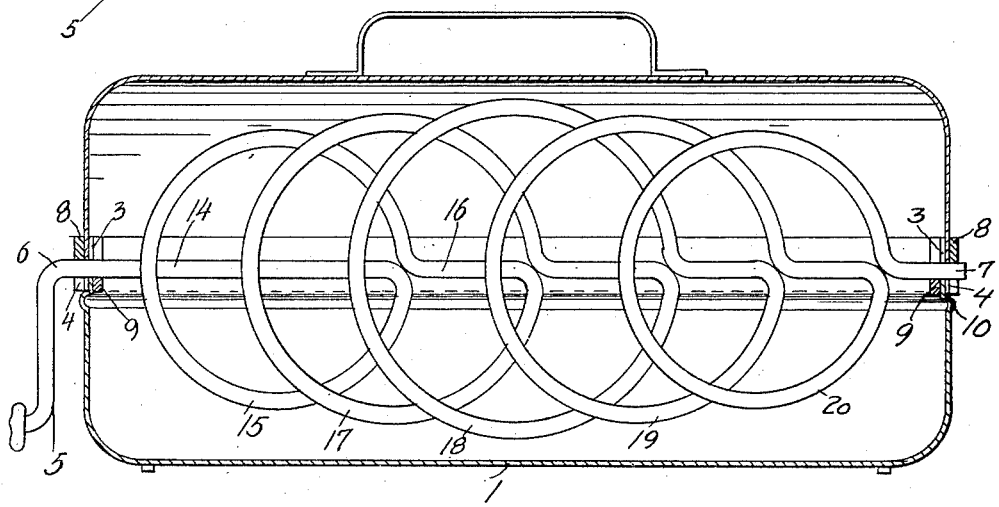
INVENTOR:
Susanna C. Hommel.
BY
ATTORNEY:

Patented Feb. 24, 1931

1,793,934

UNITED STATES PATENT OFFICE

SUSANNA C. HOMMEL, OF WHITTIER, CALIFORNIA

FOOD MIXER AND WHIPPER

Application filed February 7, 1930. Serial No. 426,567.

This invention has relation to a device for mixing foodstuff and refers particularly to means for beating cake or bread dough and for whipping eggs, cream and the like.

The object of my invention is to provide a device of this character, in which the beating operation may be performed quickly and thoroughly and with little effort on the part of the person doing the beating. A further object is the provision of a very simple device which may be easily taken apart and cleaned, and which, when not in use, will occupy very little space, in order that it may find a place in the small kitchen or kitchenette now preferred by the average housekeeper.

To this end my invention consists in the combinations hereinafter fully described and illustrated in the appended drawing, of which:

Fig. 1 is a perspective view of a structure embodying the invention, and

Fig. 2 is a cross sectional side elevation substantially in agreement with Fig. 1.

The structure of my invention comprises two main parts, a casing and a beater. The casing consists of a tray 1, on which is tightly fitted a cover 2. These two members of the casing are provided with alined notches 3, 4, of a size to receive the shanks 6, 7 of a beater 5. The casing should be made from strong, rustproof sheet metal, and the notches 3, 4 may be reinforced, substantially as indicated at 8 and 9, in order to provide sufficient bearings for the beater.

For the purpose of strengthening the structure and in order to serve as a stop for the cover 2, it is also well to provide a bead 10 on the tray.

The beater consists of a single piece ot strong metal wire, formed into a series of circular coils or loops, in the following manner. One loop 15 is first formed and bent back flatly on the wire portion 14, which latter becomes seated diametrally across the loop. From the end of the loop extends a straight portion 16, in continued alinement with the wire portion 14, far enough substantially to form a radius of the next following loop 17, which also is bent until it rests flatly upon the loop 15. The remaining loops 18, 19 and 20 are formed in the same manner.

It is to be noted, that the loops vary in diameter, the center loop being the largest and the end lops 15, 20 the smallest. The purpose of this arrangement is to create the greatest agitation in the middle, whereby the beating material constantly is drawn towards the center of the tray, to be thrown violently upward and then to be spread outward toward the ends of the casing. In this manner much more thoroughly mixing is obtained than would be possible, were the material merely revolved within the casing.

The beater is made from one continuous piece of wire in order that no weakening joints may appear. It is also much cheaper to make the beater in one piece than it would be to assemble a number of parts and firmly to combine such parts. Where the wire loops overlap it is, of course, possible to solder or weld the abutting surfaces although, where the wire used is sufficiently heavy, even this is not necessary. Utensils of this kind are usually dipped in tin, whereby the same result is obtained.

I claim:

1. The combination with a casing comprising a tray and a tight fitting cover, of a beater seated in slots of the overlapping edges of said tray and cover, said beater consisting of a single continuous piece of wire formed with a series of loops and intermediate straight portions forming the axis of the beater, the said loops being laid flatly against the said axis.

2. The combination with a suitable casing, of a beater comprising an axis journaled in said casing and formed with an operating handle projecting beyond the casing, and a series of overlapping loops resting against said axis and diminishing in size from the center of the casing towards the end walls thereof, the said beater being made from one continuous piece of wire.

3. The combination with a casing comprising a tray and a tight fitting cover, of a beater seated in slots of the overlapping edges of said tray and cover, said beater consisting of a single continuous piece of wire formed with one large circular central loop and loops extending therefrom in both directions of diminishing size, the wire being at one end bent into the shape of a crank, extending therefrom to form the diameter of the first loop coinciding with the axis of the beater, after completing said first loop the wire being bent to extend in continuation of said diameter to form the inner half diameter of the second loop, the outer half diameter being formed by the aforenamed first loop diameter, each succeeding loop being formed in the same manner, whereby the diametrically extending portions of the wire combine to form the axis of the beater.

In testimony whereof I have hereunto affixed my signature.

SUSANNA C. HOMMEL.